(12) United States Patent
Sanders

(10) Patent No.: US 6,276,523 B2
(45) Date of Patent: *Aug. 21, 2001

(54) COMPACT DISC CONTAINER

(76) Inventor: Jacaranda A. Sanders, 11510 Buckral, San Antonio, TX (US) 78232

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,049

(22) Filed: Dec. 17, 1998

(51) Int. Cl.[7] .................... B65D 85/30; B65D 85/57
(52) U.S. Cl. .............. 206/308.1; 206/818; 206/311; 206/312
(58) Field of Search ............... 206/452.6, 308.1, 206/308.2, 308.3, 309, 310, 311, 312, 313, 232, 307.1, 818; 229/92.1, 72

(56) References Cited

U.S. PATENT DOCUMENTS

| | | | |
|---|---|---|---|
| D. 304,781 | 11/1989 | Hanson | D3/35 |
| D. 318,368 | 7/1991 | Evans | D3/35 |
| D. 324,609 | 3/1992 | Yasuhara et al. | D3/35 |
| D. 360,360 | 7/1995 | Kiolbasa | D9/433 |
| D. 360,800 | 8/1995 | Temple et al. | D6/629 |
| D. 362,367 | 9/1995 | Olsson et al. | D6/632 |
| D. 371,482 | 7/1996 | Cole, Sr. | D6/626 |
| D. 382,797 | 8/1997 | House | D9/433 |
| 2,663,416 | 12/1953 | Hirsch | 206/62 |
| 2,784,757 | 2/1957 | Bosca et al. | 150/38 |
| 3,063,619 | 11/1962 | Rhoten | 229/68 |
| 3,530,981 | 9/1970 | Wienecke, Jr. | 206/62 |
| 3,688,898 | 9/1972 | Stanton | 206/62 |
| 3,722,564 | 3/1973 | Croon | 150/39 |
| 3,908,824 | 9/1975 | Takahara et al. | 206/312 |
| 4,084,690 | 4/1978 | Pulse | 206/310 |
| 4,124,118 | 11/1978 | Helm | 206/310 |
| 4,355,718 | 10/1982 | Hagelberg | 206/312 |
| 4,473,153 | 9/1984 | Colangelo | 206/312 |
| 4,511,034 | 4/1985 | Pan | 206/310 |
| 4,596,329 | 6/1986 | Eldridge, Jr. | 206/370 |
| 4,623,062 | 11/1986 | Chase et al. | 206/387 |
| 4,694,954 | 9/1987 | Moss | 206/45.26 |
| 4,850,731 | 7/1989 | Youngs | 402/79 |
| 4,874,085 | 10/1989 | Grobecker et al. | 206/309 |
| 5,048,681 | 9/1991 | Henkel | 206/312 |
| 5,101,973 | 4/1992 | Martinez | 206/312 |
| 5,147,036 | * 9/1992 | Jacobs | 206/232 |
| 5,154,284 | 10/1992 | Starkey | 206/311 |
| 5,188,229 | 2/1993 | Bernstein | 206/312 |

(List continued on next page.)

*Primary Examiner*—Paul T. Sewell
*Assistant Examiner*—Anthony Stashick
(74) *Attorney, Agent, or Firm*—Cox & Smith Incorporated

(57) ABSTRACT

A flexible book-like storage receptacle for a compact disc and the printed material that typically accompanies such compact discs. The storage receptacle includes a number of clear, pliable panels movable between an open position for easy access to the contents, and a closed position for storage. The storage receptacle includes layered sidewalls designed as pockets for receiving printed material, as well as for providing support to the compact disc. In addition, the receptacle includes one of a number of different retention post structures to securely hold the compact disc in place. Variations for the retention post include a compressible core, a compressible rectangle, a molded cradle, and strategically placed compressible stoppers. Attached to the perimeter of each of the panels of the receptacle is a flexible magnetic seal that serves to maintain the package in a closed position until it is intentionally forced apart to access the stored items.

4 Claims, 6 Drawing Sheets

U.S. PATENT DOCUMENTS

| | | | |
|---|---|---|---|
| 5,188,320 | 2/1993 | O'Brien et al. | 206/312 |
| 5,207,717 | 5/1993 | Manning | 206/232 |
| 5,219,417 | 6/1993 | O'Brien et al. | 206/312 |
| 5,318,222 * | 6/1994 | Bartlett | 229/72 |
| 5,332,089 | 7/1994 | Tillett et al. | 206/310 |
| 5,333,728 | 8/1994 | O'Brien et al. | 206/232 |
| 5,366,074 | 11/1994 | O'Brien et al. | 206/312 |
| 5,372,253 | 12/1994 | O'Brien et al. | 206/312 |
| 5,419,433 | 5/1995 | Harrer et al. | 206/313 |
| 5,421,453 | 6/1995 | Harrer et al. | 206/312 |
| 5,460,265 * | 10/1995 | Kiolbasa | 206/308.1 |
| 5,472,083 | 12/1995 | Robinson et al. | 206/308.1 |
| 5,501,326 | 3/1996 | Shuhsiang | 206/307.1 |
| 5,529,182 | 6/1996 | Anderson et al. | 206/308.1 |
| 5,531,320 | 7/1996 | Uchida | 206/308.1 |
| 5,549,199 | 8/1996 | Lindsay | 206/308.1 |
| 5,593,030 | 1/1997 | Tell | 206/308.1 |
| 5,657,867 | 8/1997 | Fu et al. | 206/308.1 |
| 5,669,491 * | 9/1997 | Pettey | 206/308.1 |
| 5,685,424 | 11/1997 | Rozek et al. | 206/308.1 |
| 5,775,490 * | 7/1998 | Baker et al. | 206/308.1 |
| 5,881,870 * | 3/1999 | Nakahira et al. | 206/308.1 |
| 5,901,843 * | 5/1999 | Gambardella et al. | 206/308.1 |
| 5,931,293 * | 8/1999 | Seelenmeyer | 206/308.1 |
| 5,947,281 * | 9/1999 | Kaneff | 206/308.1 |
| 5,971,157 * | 10/1999 | Howell et al. | 208/308.1 |

* cited by examiner

COMPACT DISC CONTAINER

BACKGROUND OF THE INVENTION

1. Field of the Invention

The present invention relates generally to containers made of transparent material for storing both a compact disc and its accompanying printed material. The invention relates more specifically to an improved container for storing a compact disc and printed material, that provides a releasable magnetic or electrostatic means for maintaining the container in a closed configuration.

2. Description of Related Art

With the proliferation of the digital compact disc, there has developed a need for a package design that will protect the disc from scratches, abrasion, dust particles, and the like. The most commonly used package at the present time is a hard plastic container often referred to as a "jewel box". More recently, as a result of the need to find a more economical and compact container, several new compact disc storage devices have been introduced.

One alternative to the "jewel box" is a book-like cover with pockets to hold both the printed material and the compact disc. An example of such a design is described in U.S. Pat. No. 5,207,717 issued to Manning on Jun. 15, 1993. There are several drawbacks to such designs. First, inserting and removing the compact disc from the pocket can be quite difficult and often abrasive to the disc surface. In addition, there is no specific mechanism for keeping the cover closed once the compact disc has been inserted and the container has been folded into a collapsed position. And thirdly, in order for one to read the table of contents, typically on the backside of the pamphlet insert, the cover must be opened.

A second attempt to produce a more economical and compact container is a package constructed of paper with a central post to hold the compact disc and further with an adhesive on the top of the post to hold the package closed when the compact disc has been inserted. An example of such a design is described in U.S. Pat. No. 5,332,089 issued to Tillett et al. on Jul. 26, 1994. There are three main disadvantages with this package design. First, the adhesive used to hold the package closed has a limited life, with dust and other particles rendering it useless within a short period of time. Second, the package has no pockets for separate printed materials as most often accompany a compact disc. And third, because the cover is not completely sealed when in a closed condition, dust and other particles can still settle on the surface of the compact disc.

SUMMARY OF THE INVENTION

The present invention relates to a flexible book-like cover preferably made of transparent material for storing both a compact disc and its accompanying printed material. A transparent pliable plastic is preferably utilized for the basic components of the cover. Other pliable or semi-rigid, planar materials such as paper, paperboard, or cardboard, may also be used. The cover includes two or more pockets that allow for insertion of printed material in a manner that permits an individual to read every page of the material without removing it from the cover. In addition, because the cover has two pockets (at a minimum) for the printed material, the table of contents of the compact disc (which is typically printed on the back of the last page of the material) can be read without opening up the cover.

The cover is constructed from a single rectangular strip of transparent material which is folded back on itself at each end, sealed on at least the three outer edges of the cover, and then folded in half to form the book-like cover. The size of the material to make the pockets is preferably smaller in width than the outside face of the cover to form the pocket, but could be of any size or shape. The inside layer of each pocket includes a slit parallel to the spine and approximately ⅛" to ¼" from the outer edges to slip printed material through, and thus eliminate the need to remove the printed material in order to read all pages of a pamphlet. This is especially useful when the printed material is a rectangular piece of paper folded into thirds with two separate fold lines as is sometimes used in the recording industry. This is also appropriate when there are multiple pages in the pamphlet whereby the front and back pages are each inserted into the pockets of the cover to secure the pamphlet in place. The remaining pages can be temporarily secured by slipping them under the slit and are easily freed to flip through for reading or viewing.

In order to reduce the amount of plastic utilized, instead of full pockets, strips of transparent plastic (rather than a full sheet) can be attached to the front and back inside of the covers. These strips may be placed directly adjacent and parallel to the spine, positioned directly in the center of each panel, directly opposite but parallel to the spine, or diagonally across each panel. In addition, a curved pocket in the shape of the CD, but slightly larger, can be utilized.

A retention post is attached to the inside panel of either the front or back cover, or both, and preferably includes a layer of pliable material to hold the compact disc (or discs) in place, requiring limited force to snap the compact disc into place and also to remove it. One such retention post structure is an oblong strip having the same thickness as the compact disc. Other more conventional retention posts can be used, such as a round core or pliable plastic tabs as are commonly used in the "jewel box" design.

In the preferred embodiment, the spindle-like post is made of a sponge-like, pliable but resilient material, preferably transparent, and is used to hold the compact disc in place. The post is slightly larger in diameter than the hole of the compact disc and can be of a variety of shapes, i.e. round, oblong, rectangular, etc. The thickness of the post is preferred to be the same as the thickness of the compact disc so as to avoid any creases or indentions. In addition, a paper-thin piece of plastic (in one embodiment) is attached to the post, the plastic "cap" being slightly larger in diameter than the post, thereby holding the compact disc in place, but flexible enough to allow for easy removal with minimum force.

To eliminate the creases often created by the shape of the disc, a single sheet of transparent, non-pliable material can be inserted in each of the pockets. A second alternative embodiment involves doubling the thickness of the inside of the back and front panels by extending the length of the rectangular plastic sheet material and creating an additional fold prior to sealing. A third method of preventing cover creasing involves constructing a cradle (molded to shape of the compact disc) within which to set the compact disc. When the cover is in a collapsed position, the cradle provides a flat surface, thereby eliminating any depressions that might cause creases or indentions. With such an embodiment, the cradle could also double as a locking device to secure the CD into place.

Flexible magnets are used to seal the cover closed in a collapsed position. Alternatively, the cover may be held closed using a combination of flexible magnets and flexible metallic strips. The strips, when placed together to form the seal, are the same thickness as the compact disc, thereby creating a flat surface.

Other closures include the following which are applied to the inside of the front cover so that the front cover adheres to the back cover when in a closed position:

- magnetic strips/strips of material containing metallic particles;
- electrostatic surfaces;
- light adhesives;
- velcro;
- snaps;
- plastic sealing strips (plastic food storage bags);
- additional flap that folds over the closed cover.

To make opening the cover easier, the top portion of the cover may be fractionally larger in width than the bottom portion of the cover so as to allow the cover to be easily gripped. In a second embodiment, a small section of a corner, such as a triangle, is cut out of the top right hand corner of the backside of the cover. In a third embodiment, a half moon shape is cut out of the backside panel about the side of a human finger.

BRIEF DESCRIPTION OF THE DRAWINGS

FIG. 1b is a cross-sectional view of the layers of the embodiment of the present invention shown in FIG. 1a.

DETAILED DESCRIPTION OF THE PREFERRED EMBODIMENT

Figure 1A:
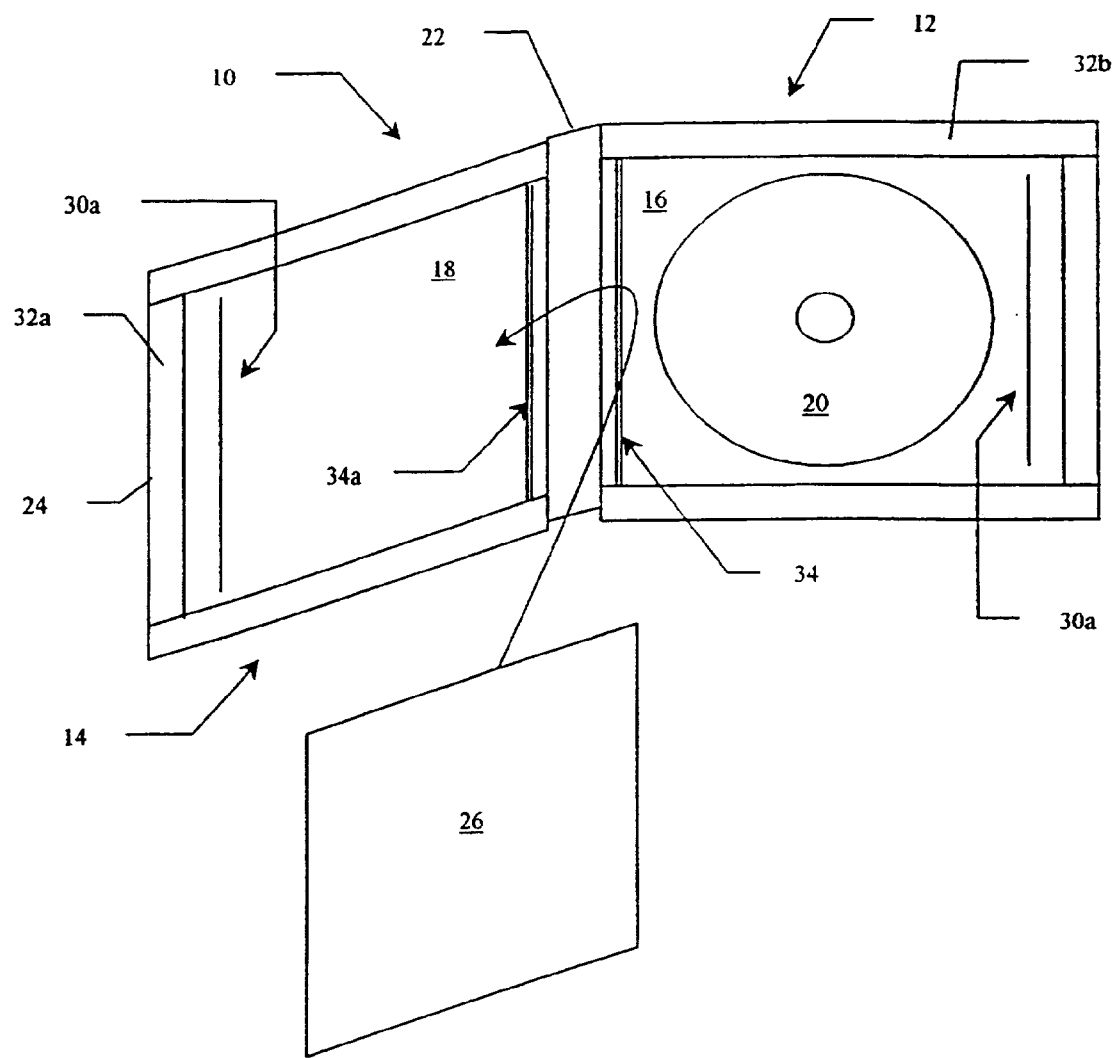
FIG. 1a is a perspective view of the container of the present invention shown in its open configuration.

Reference is made first to FIG. 1a which is a perspective view of a first preferred embodiment of the present invention. FIG. 1a shows compact disc container (10) in its open configuration with compact disc (20) positioned within. CD container (10) is comprised primarily of back cover (12) to front cover (14). Connecting back cover (12) and front cover (14) is flexible spine (22). Compact disc (20) is positioned on back cover (12) by attachment to center post (28) as described in more detail below.

The perimeters of both back cover (12) and front cover (14) have flexible magnetic strips (32a) and (32b) as shown. Magnetic strips (32a) and (32b) are positioned on the perimeter of back cover (12) and front cover (14) with the exception of the edge of each immediately adjacent to spine (22). Magnetic strips (32a) and (32b) are oriented such that there is a magnetic attraction between the strips when front cover (14) is closed over back cover (12). Magnetic strips (32a) and (32b) may be adhesively positioned on the inside surfaces of inside back panel (16) and inside front panel (18), or as in the preferred embodiment, may be adhesively positioned between the panel layers from which back cover (12) and front cover (14) are constructed. The manner in which magnetic strips (32a) and (32b) may be positioned between these cover layers will be understood from the description of the construction of back cover (12) and front cover (14) as shown and described with respect to FIGS. 2a–2b and 3a–3b below.

There are a number of additional features to CD container (10), disclosed in FIG. 1a, that are described in greater detail below. Inside back panel (16) and inside front panel (18) each provide one wall of an envelope suitable for insertion of various types of printed material. Inside back panel (16) retains both pocket opening (34b) and slit (30b) suitable for the insertion of printed material. Likewise, inside front panel (18) includes pocket (34a) into which rigid plastic insert (26), shown in FIG. 1a, may be inserted, as well as slit (30a) for insertion of additional printed material. Finally, extended edge (24) is provided on front cover (14) to facilitate the separation of front cover (14) from back cover (12) when container (10) is in a closed condition.

Figure 1B:
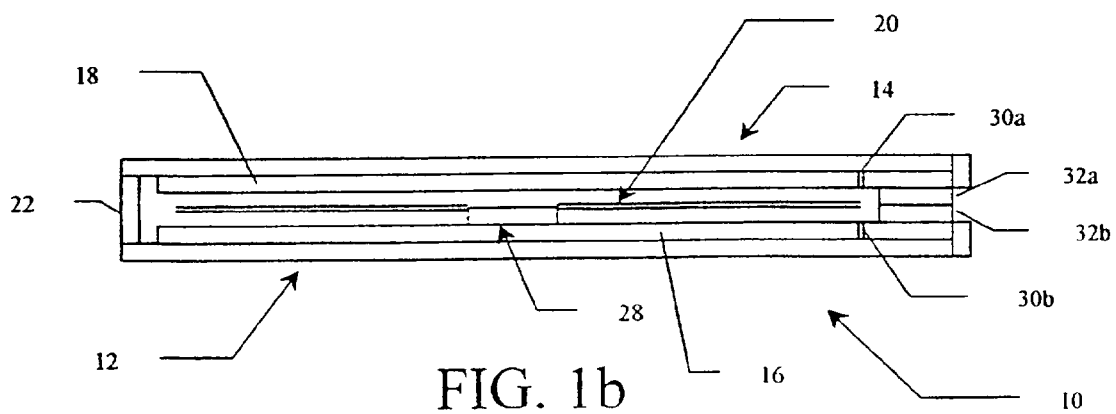

FIG. 1b discloses a cross-sectional view of the embodiment shown generally in FIG. 1a providing greater detail of the various layers associated with the construction of CD container (10). In FIG. 1b, back cover (12) and front cover (14) are shown in a closed configuration. Spine (22) retains front cover (14) and back cover (12) in close association in the closed condition. At an opposite end, magnetic strips (32a) and (32b) retain the covers together. As indicated above, magnetic strips (32a) and (32b) could alternately be positioned between the layers of front cover (14) and back cover (12) respectively.

Inside panels (16) and (18) are shown as they are positioned coplanar with, and part of, covers (12) and (14), respectively. Slits (30a) and (30b) are shown in their appropriate positions on panels (18) and (16).

Compact disc (20) is shown centered in the cross-sectional view of FIG. 1b, positioned as it would be on retention post (28). Compact disc (20) is retained on retention post (28) by any of a number of different retention mechanisms described in more detail below.

It should be noted that FIG. 1b is schematic in nature and is not intended to represent the actual dimensions or geometries of the cross-sectional structure of the present invention. It is anticipated that little or no extra space would be present within the container once in a closed condition. It is anticipated, for example, that the separation provided by spine (22) and magnetic strips (32a) and (32b) would be of a dimension approximately equal to the thickness of compact disc (20) so as to provide as thin a profile as possible from the constructed materials. It is also anticipated that with certain embodiments, spine (22) could be eliminated as a separate piece altogether through the attachment of front cover (14) directly to back cover (12) as described in more detail below.

Although the preferred embodiment of the present invention incorporates clear, pliable plastic material for the planar components of the container, it is possible to substitute for such plastic components, similar components constructed from other pliable materials. Examples include paper, paperboard, and cardboard sheets that are cut and configured in the same manner as the plastic sheets described in the preferred embodiment. One of the advantages provided by clear plastic sheet material is its transparency for the purpose of exposing printed material that may be contained within. Many components of the present invention, however, do not require, and are not positioned appropriately for the purpose of exposing contained printed material. It is therefore possible to replace the clear plastic pliable material with other sheetlike materials that may or may not be transparent. These could include opaque plastic sheets as well as the above mentioned paper products.

It should also be understood with the substitution of paper products and the like for the pliable plastic material described in the preferred embodiment, that alternative adhesive mechanisms would be required for both the construction of the container and the placement of various attachments to the container. For example, whereas the clear plastic, pliable sheets might be heat sealed at their perimeters in order to form the pockets described, paper product sheet materials would require alternative forms of adhesives to be placed between the layers in order to appropriately seal the container covers and form the pockets described. Likewise, alternative adhesives would be required for adhering the various additional components of the container to the surfaces of the paper product covers. Such adhesives and their ability to seal such paper products are well known in the art.

While the use of opaque plastic sheet material and paper products would eliminate the ability of the covers to be transparent to printed material placed within the pockets therein, such materials would have the added advantage of being generally more "printable" in a manner that could ultimately replace the need for the insertion of printed materials. Such printing directly on the container of the present invention could be an alternative to, or an addition to, printed materials placed within the container in conjunction with the compact disc. Semi-transparent configurations are also anticipated wherein designs or text are printed on the surfaces of the clear plastic material. It is also anticipated that combinations of plastic and paper product sheets could be utilized for the various layers involved in the construction of the container of the present invention. The rigid panel, for example, inserted between the layers of the basic front and back cover constructions could be made of a cardboard material while the cover construction itself would be from a clear, pliable plastic. Other combinations of materials are additionally anticipated.

Figure 2A:
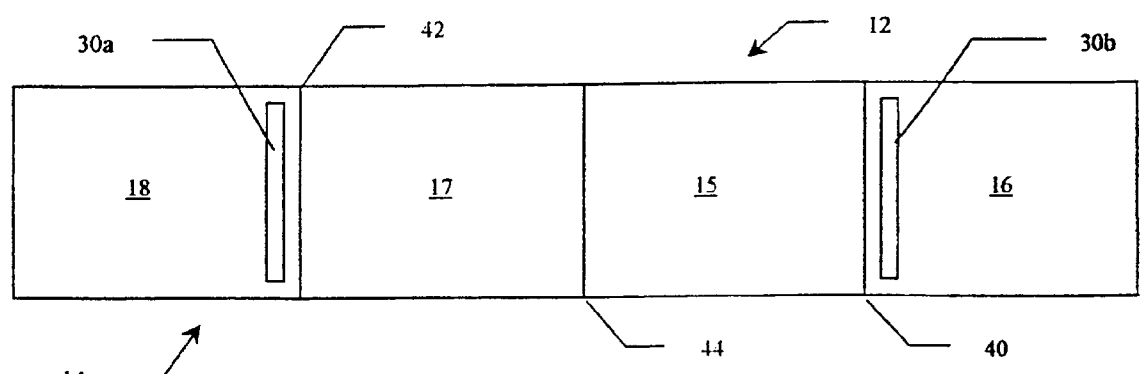
FIG. 2a is plan view of the components of a first embodiment of the present invention prior to construction.
Figure 2B:
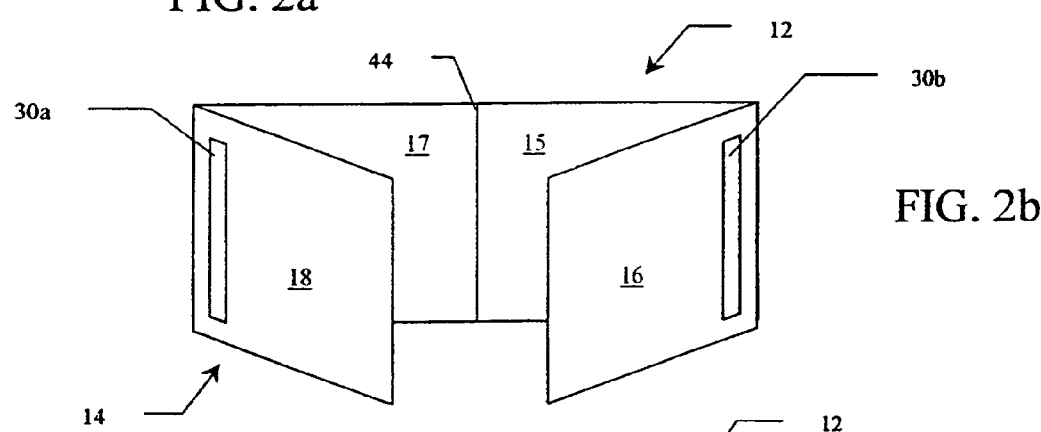
FIG. 2b is perspective view of the embodiment shown in FIG. 2a during construction.

Reference is now made to FIGS. 2a and 2b for a description of the structure and the method of construction for a first embodiment of the present invention. FIG. 2a discloses a single rectangular sheet of clear plastic material of a thickness sufficient to be durable through repeated use, but pliable enough to be folded and creased as indicated. The rectangular section of plastic material is generally divided into four components along three fold lines (40), (42), and (44). Fold line (40) divides inside back panel (16) from outside back panel (15), which together make up back cover (12). Likewise, fold (42) separates inside front panel (18) from outside front panel (17), which together make up front cover (14). The spine of the container in this embodiment is provided by fold (44) which separates front cover (14) from back cover (12). Also shown in FIG. 2a are slits (30a) and (30b) cut where appropriate in panels (16) and (18) so as to be positioned for insertion of printed material when the container is constructed.

As an alternative, the configuration shown in FIG. 2a could be constructed from individual panels that are welded together (instead of folded) at the seams indicated. In addition, panels (15)–(18) could be comprised of plastic sheets of varying thickness and rigidity. Panels (15) and (17), for example, could be made of hard plastic to provide greater protection and a more rigid shape. Referring now to FIG. 2b, the basic container is constructed by folding the rectangular sheet of plastic as indicated above to form back cover (12) and front cover (14). Once panel (16) is closed over top of panel (15), and panel (18) closed over (17), the edges of each panel may be adhesively sealed or heat sealed so as to form pockets with the primary openings being slits (30a) and (30b). The process of adhesively sealing or heat sealing the perimeters of the panels as described serves to strengthen and support the structure of the cover when complete. Subsequent additions of the magnetic materials and the center posts are described in more detail below.

Figure 3A:
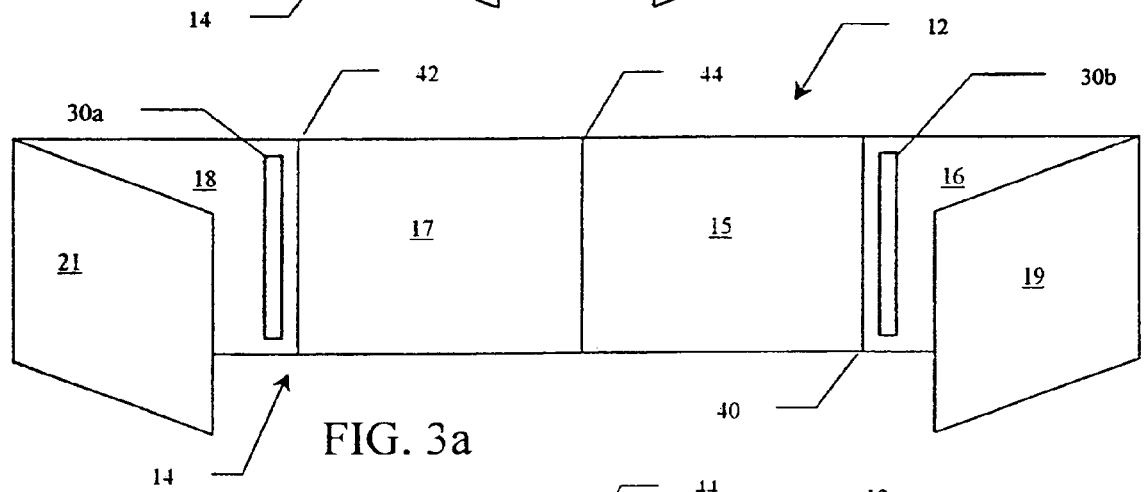
FIG. 3a is a perspective view of a second embodiment of the present invention shown prior to construction.
Figure 3B:
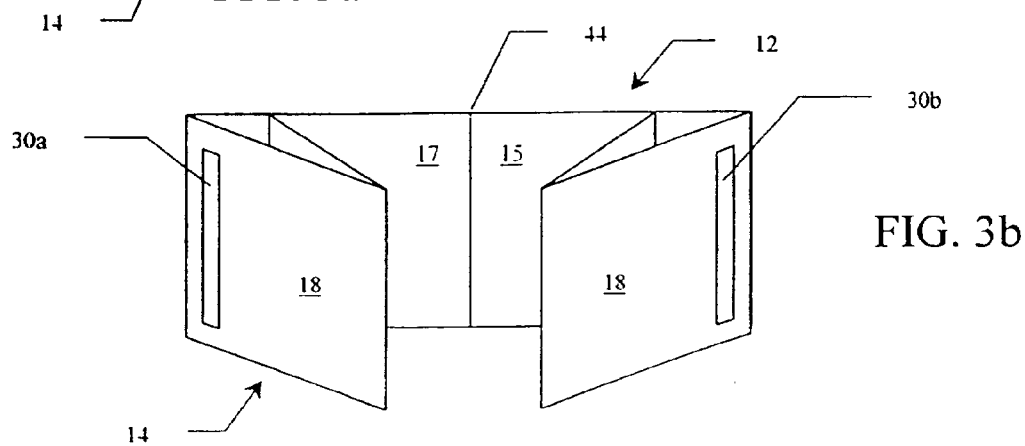
FIG. 3b is a perspective view of the second embodiment of the present invention shown in FIG. 3a during construction.

Reference is now made to FIGS. 3a and 3b for a second embodiment of the present invention incorporating an additional length of clear plastic material to further strengthen the container and to prevent the appearance of creases and indentations on the outside covers as a result of impressions made by the retained compact disc. In this embodiment additional panels (19) and (21) are folded where indicated back over on panels (16) and (18), prior to folding over panels (15) and (17), respectively. In this manner a pocket is formed between panels (16) and (19) accessible through slit (30b), as well as between panels (18) and (21) accessible through slit (30a). Construction of the container, shown in FIG. 3b, is accomplished much in the same manner as with the "four panel" construction described above in FIGS. 2a and 2b. Each cover now contains three layers of panels, which are adhesively sealed or thermally sealed to form appropriate pockets. In this configuration (FIG. 3b) a total of four pockets might easily be constructed, the first two accessible through slits (30a) and (30b), and a second two accessible by means of the open edges of the panels along spine fold line (44). This would be similar to the construction described in FIG. 1a providing for pockets (34a) and (34b).

The configuration described in FIGS. 3a and 3b provides the additional advantage of increased layering to prevent the formation of creases and indentations visible on the outside surfaces of the back and front covers. This is an alternative to or an addition to the use of a thin but rigid clear plastic insert as shown in FIG. 1a for preventing the formation of creases and indentations. Such a clear plastic rigid insert could be utilized in conjunction with either the embodiment shown in FIGS. 2a and 2b or the embodiment shown in FIGS. 3a and 3b.

Reference is now made to FIGS. 4–8 for detailed descriptions of various methods and structures for retaining printed materials within the compact disc container. Each of the figures show the compact disc in its open configuration with back cover (12) on one side and front cover (14) on the other. Magnetic strips (32a) and (32b) are shown as they are positioned around the perimeters of back cover (12) and front cover (14). Inside panels (16) and (18) are shown as they would be exposed in this open configuration.

Figure 4:
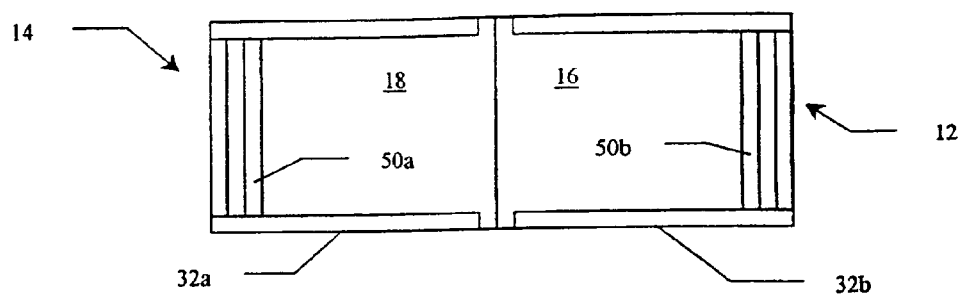
FIG. 4 is a plan view of a partially constructed embodiment of the present invention shown with pocket slits on each cover.

In FIG. 4, the simplest construction would include the components as described in FIGS. 2a and 2b. The result comprises two layers for each cover with access between the layers provided by slits (50a) and (50b). In this manner appropriate printed material can be slipped between the layers of the covers in order that they may be exposed to both the inside and outside of the container.

Figure 5:
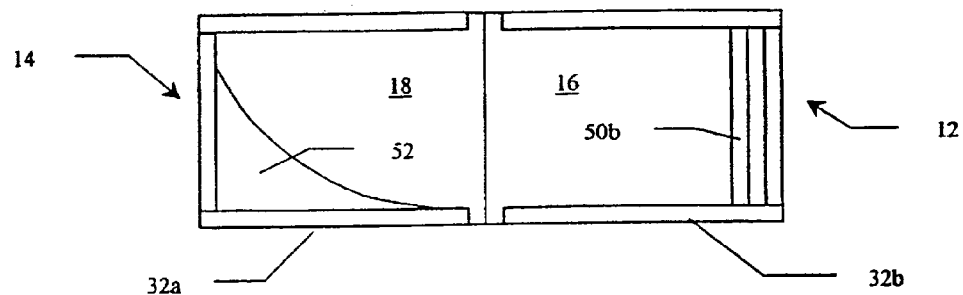
FIG. 5 is a plan view of a partially constructed embodiment of the present invention disclosing a partial pocket on the cover.

In FIG. 5, half pocket (52) replaces slit (50a) on front cover (14) as a means for insertion and retention of printed material. Alternatively, half pocket (52) could be sized and shaped so as to retain a second compact disc within the holder. In addition, half pocket (52) should be slightly oversized so as to bow outward from panel (18) to easily receive the compact disc or printed material. Likewise in FIG. 6, plastic strip (54) replaces slit (50a) as a means for retaining printed material within the confines of magnetic strips (32a) and against front panel (18). In each case (FIG. 5 and FIG. 6) slit (50) remains on back panel (16) for the insertion of printed material therein.

Figure 7A:
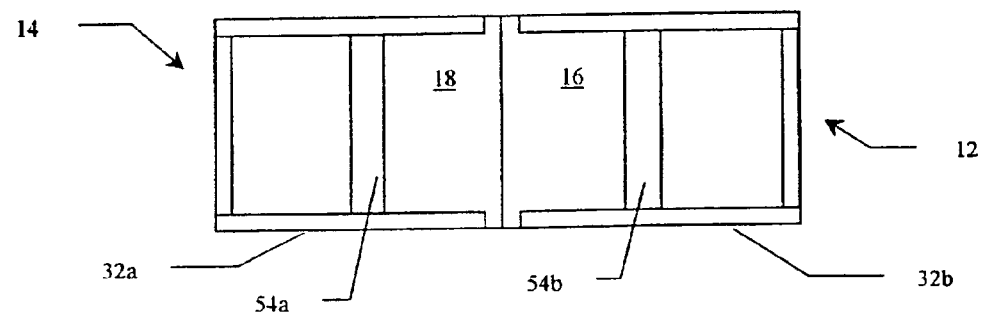
FIG. 7a is a plan view of a partially constructed embodiment of the present invention showing two plastic strips on the cover centrally positioned.
Figure 7B:
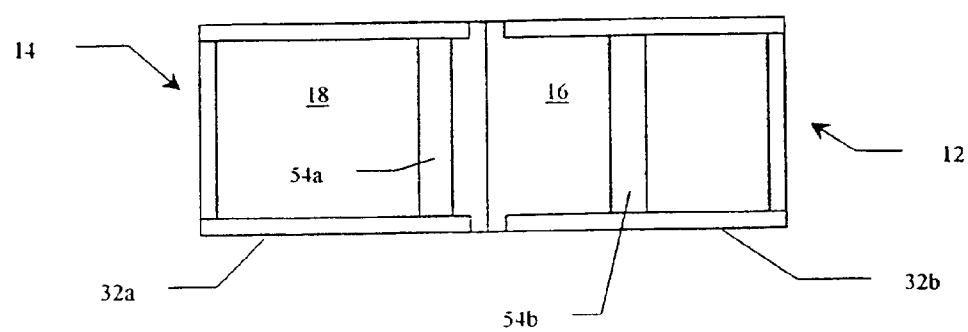
FIG. 7b is a plan view of a partially constructed embodiment of the present invention showing two plastic strips in alternative positions on the cover.
Figure 8:
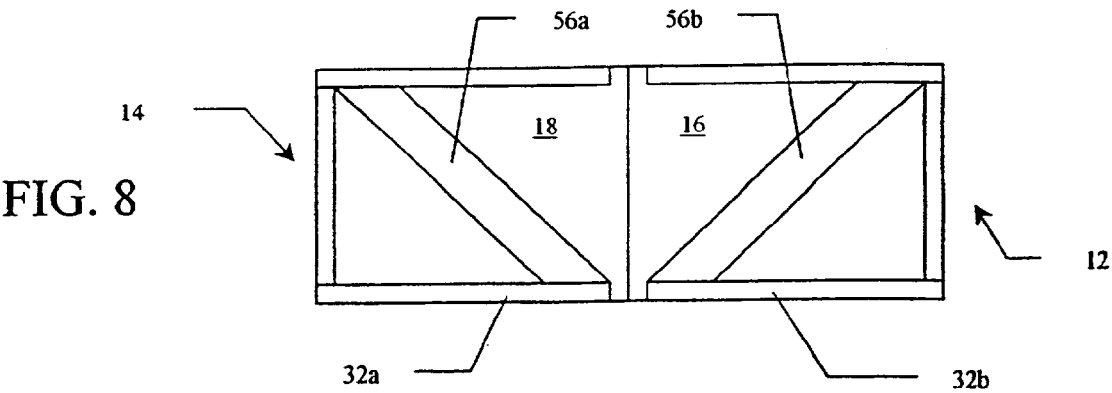
FIG. 8 is a plan view of a partially constructed embodiment of the present invention showing two diagonal plastic retention slips on the cover.

In FIGS. 7a and 7b, both slits (50a) and (50b) are replaced with plastic strips (54a) and (54b) centered on panels (18) and (16) as shown (FIG. 7a), or otherwise positioned to facilitate the insertion of printed materials (FIG. 7b). Finally, in FIG. 8, diagonal plastic strips (56a) and (56b) are positioned on front cover (14) and back cover (12) for the retention of printed materials.

Figure 6:
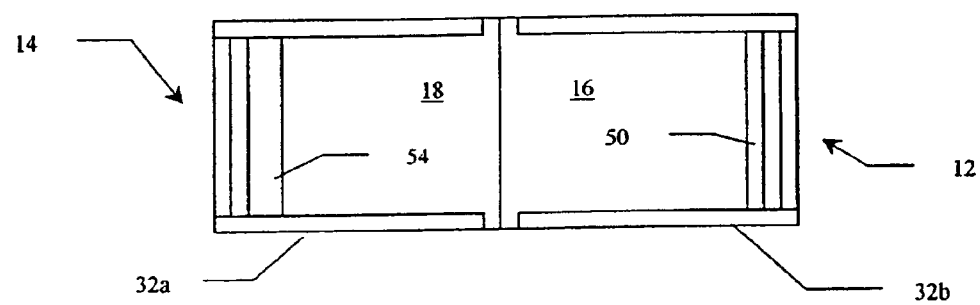
FIG. 6 is a plan view of a partially constructed embodiment of the present invention showing a plastic strip retainer on the cover.

In each case where a strip of plastic replaces some portion of the basic cover construction, such strips are adhered to the covers in the same manner as the cover layers are sealed together. In other words, half pocket (52) shown in FIG. 5, as well as plastic strips (54) shown in FIGS. 6, 7a, and 7b, are adhered at their end points where they contact the perimeters of panel (18) for the front cover, and (16) for the back cover. In each case the center retention post suitable for retaining the compact disc, has been removed from the drawings for clarity.

In FIGS. 4–8, the positioning of magnetic strips (32a) and (32b) about the perimeters of back cover (12) and front cover (14) is clearly shown. The construction of these magnetic strips could take a number of forms depending upon the raw material used for the magnetic surfaces. It is anticipated that the thickness of the material could be as little as half the thickness of a standard compact disc such that the combined thicknesses of two layers of the magnetic material would equal that of the compact disc. It is typical to acquire such magnetic strips in long, narrow sections such as are shown in the drawing, and to construct a perimeter seal by piecing together three such long, narrow sections as indicated.

Alternative embodiments of the present invention could include more or less magnetic material, depending upon the tightness with which the container needs to be closed. In a simpler construction, for example, small magnetic discs could be positioned on the front cover and back cover at the corners as a means for retaining the covers closed together. The preferred embodiment, however, is to provide a magnetic seal fully around the perimeter of the container so as to prevent the intrusion of dust and other particles. In yet another embodiment, a metallic strip might be substituted for one of the two sections of magnetic material so as to further reduce the cost and/or the thickness of the construction of the container.

Figure 9A:
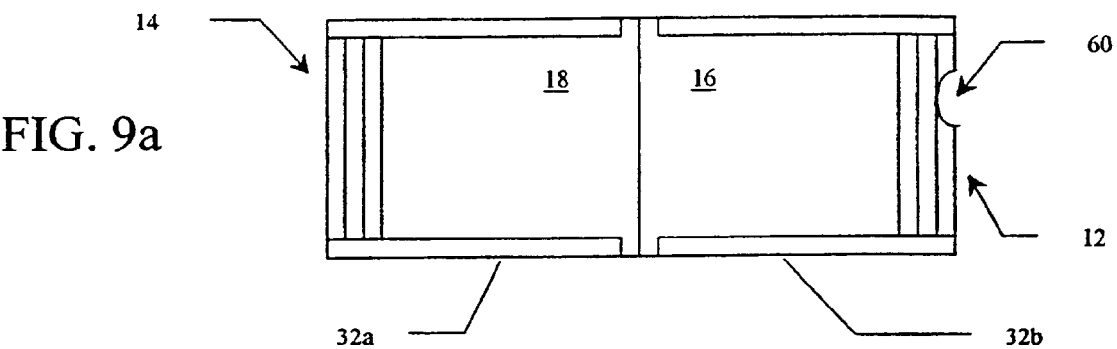
FIG. 9a is a plan view of a partially constructed embodiment of the present invention showing a finger grip cut-out on the back cover.

Reference is now made to FIGS. 9a through 9f for alternative structures for facilitating the opening and closing of the container. In FIG. 9a, a half moon shaped cut-out (60) is made in back cover (12) so as to facilitate the separation of front cover (14) from back cover (12) when magnetic strips (32a) and (32b) are engaged in maintaining the covers closed. Cut-out (60) permits the user to insert either a finger or thumb against an exposed inside surface of front cover (14) and thereby separate it from back cover (12). This may be in addition to or as an alternative to edge (24) shown in FIG. 1a, also provided to facilitate the separation of the covers.

Figure 9B:
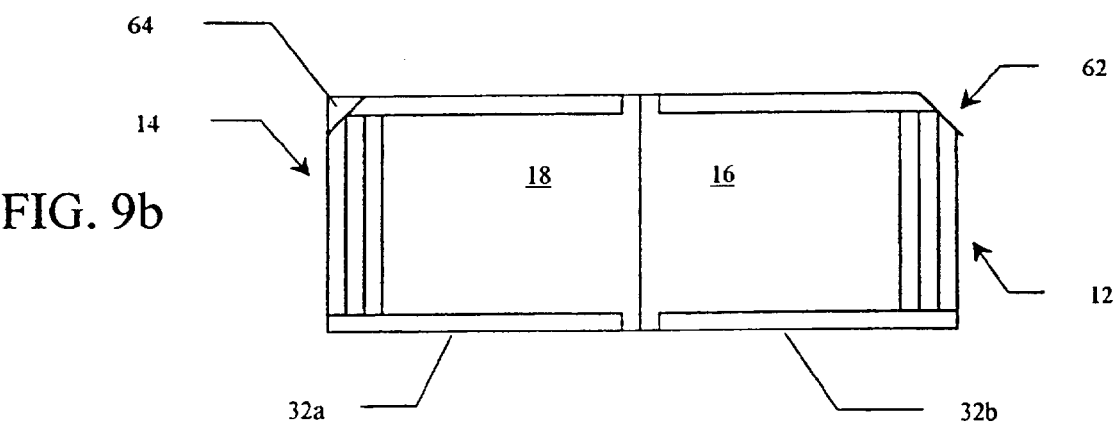
FIG. 9b is a plan view of a partially constructed preferred embodiment of the present invention showing a corner cut grip configuration.

FIG. 9b discloses an alternative whereby corner (62) is cut from back cover (12) and matches with raised corner (64) positioned on front cover (14). This configuration has the advantage of providing a flat profile both back and front and still provides a point at which the front cover may be grasped and separated from the back cover.

Figure 9C:
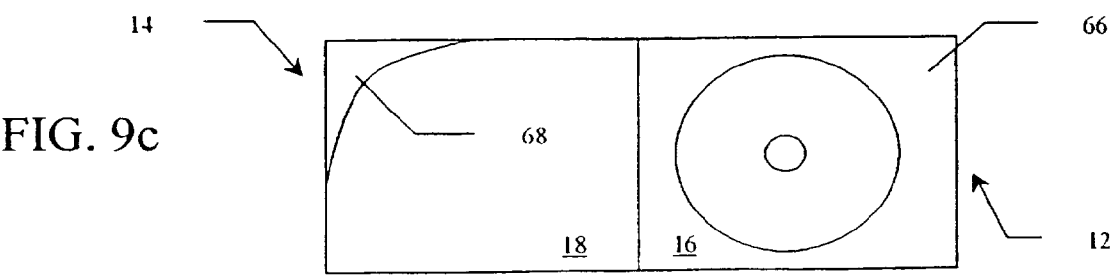
FIG. 9c is a plan view of an alternative embodiment of the present invention without the magnetic closures.

FIG. 9c discloses an even simpler construction of the basic invention, eliminating the need for the use of magnetic strips altogether. In FIG. 9c, back cover (12) is constructed of a pliable, clear plastic material as described above. Compact disc (20) is positioned as shown, and back panel (16) folds against front panel (18) as described with the previous embodiments. Retaining the covers together, however, involves slipping corner (66) of back cover (12) under corner pocket (64), positioned and attached to front panel (18) of front cover (14). Since the material of back cover (12) is flexible, corner (66) may bend around the edge of compact disc (20) sufficiently to permit the insertion of corner (66) into pocket (64) in a manner that retains back cover (12) closed against front cover (14).

Figure 9D:
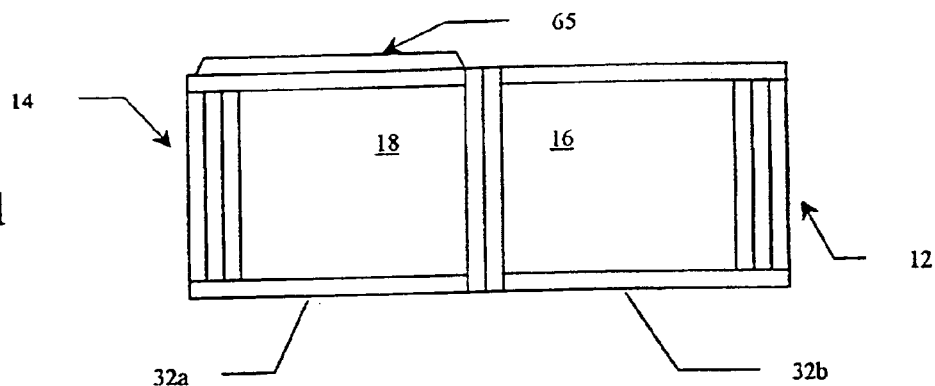
FIG. 9d is a plan view of a partially constructed embodiment of the present invention showing an extended upper lip on the front cover.

FIG. 9d discloses an embodiment wherein an extended lip (65) is provided on front panel (18) to facilitate separation of front cover (14) from back cover (12) in the process of opening the container. Extended lip (65) may be constructed of a more rigid material in order to allow the user an area to grip and thereby "pry apart" the two covers (14) and (12).

Figure 9E:
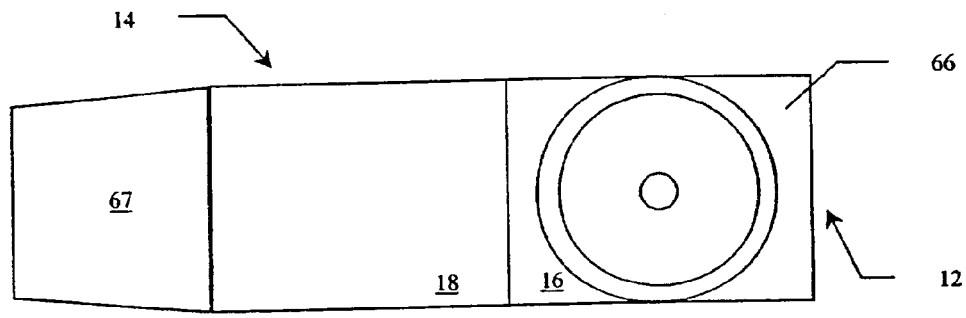
FIG. 9e is a plan view of a further alternative embodiment of the present invention without the magnetic closures.
Figure 9F:
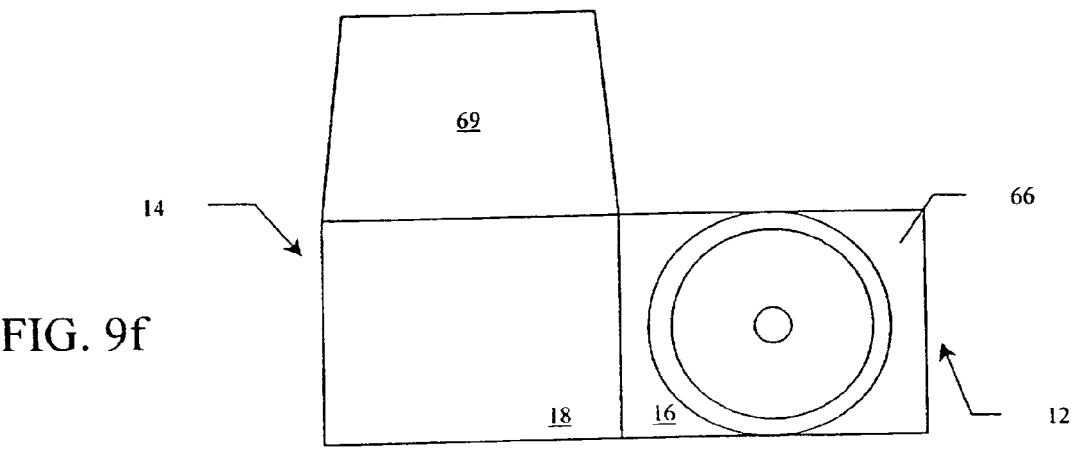
FIG. 9f is a plan view of a further alternative embodiment of the present invention without the magnetic closures.

FIGS. 9e and 9f show two alternative configurations of the basic invention, each of which, like the structure shown in FIG. 9c, eliminates the need for magnetic strips. In FIG. 9e, flap (67) is either an extension of front panel (18) or is a separate segment welded to front panel (18). In either case, flap (67) is positioned such that when front cover (14) is closed against back cover (12), flap (67) may fold around the back of back cover (12) to secure the container in a closed configuration. FIG. 9f shows a similar embodiment with flap (69) extending from a top (orthogonal) edge of front panel (18). The embodiments shown in FIGS. 9e and 9f do not require the use of an additional means for maintaining the container closed but do lend themselves to the use of the above mentioned electrostatic means for closure. In this case, the inside surface of flaps (67) and (69) are electrostatically charged so as to be attracted to the outside surface of back cover (12).

Reference is now made to FIGS. 10a–10d for a detailed description of various mechanisms for positioning and retaining compact disc (20) within the confines of container (10). In general, compact disc (20) is to be positioned centrally on back panel (16) of back cover (12), generally as described with respect to FIG. 1a. As indicated above, however, it is anticipated that a mechanism for positioning and retaining a compact disc could alternately or additionally be placed on inside panel (18) of front cover (14). The structure and function of the retention mechanisms described herein for positioning on inside back panel (16) are likewise applicable to such mechanisms positioned on inside front panel (18). The present invention could therefore serve to retain two compact discs within the confines of the container. Various combinations of attachment means are anticipated. These combinations include variations for both center post (28), shown in FIG. 10a, and variations on the construction of inside back panel (16). In one configuration inside back panel (16) is comprised of either a multi-layer panel with a full rectangular sheet of clear plastic material and a partial sheet of spacing material with a portion cut out to the dimensions of compact disc (20). Alternately, back panel (16) could be a formed sheet of material providing a depression (70) suitable for retaining compact disc (20). In either case, the primary structural component serving to retain and position compact disc (20) is center post (28).

Figure 10A:
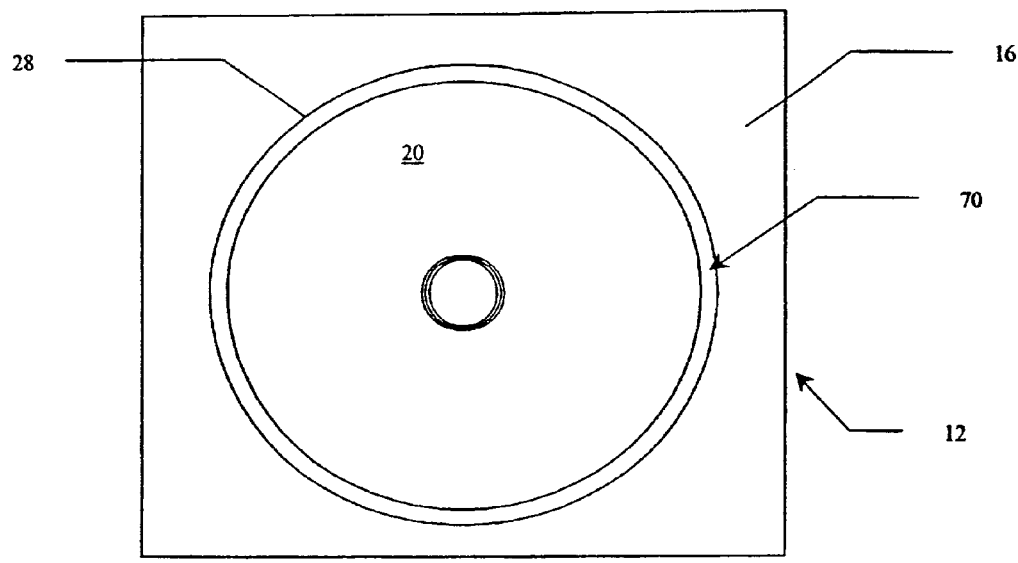
FIG. 10a is a plan view of the general structure for retention of the compact disc in the present invention.
Figure 10B:
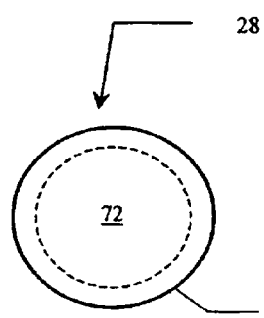
FIGS. 10b–10f are detailed views of alternative means for retaining the compact disc within the present invention.
Figure 10C:
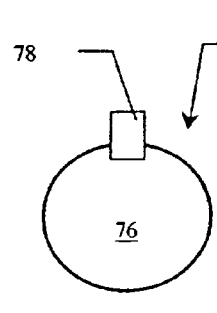
Figure 10D:
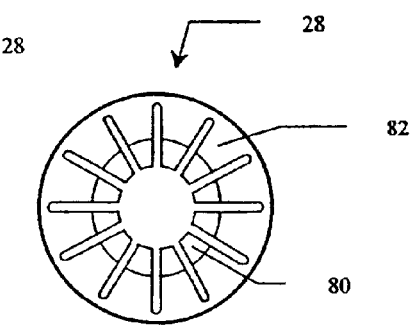

FIGS. 10b–10d disclose three alternative mechanisms for retaining compact disc (20) on center post (28). The goal of each of these mechanisms is to provide a secure means of attaching compact disc (20) to center post (28) and yet still permit its easy removal for use. FIG. 10b discloses a center post (28) constructed of pedestal (72) and circular cap (74). Pedestal (72) is typically a thin, dense foam material cut into a disc and adhesively positioned on inside back panel (16) in a central location. On top of pedestal (72) is positioned circular cap (74), which in the preferred embodiment is comprised of a pliable, thin plastic sheet having a diameter slightly greater than that of pedestal (72). Pedestal (72) has a diameter approximately equal to or slightly less than the diameter of the hole found in most compact discs. In this manner, pressure on the compact disc down around center post (28) pushes the compact disc past pliable cap (74) to a position surrounding pedestal (72). Cap (74), once the compact disc pushes past it, snaps back into a position that partially retains the compact disc in place.

FIG. 10c discloses a mechanism similar to that shown in FIG. 10b but with a pliable retention material only partially extending from the pedestal. In FIG. 10c, pedestal (76), again typically a dense, firm rubber disc or the like having a diameter equal to or slightly less than the diameter of the central hole in a compact disc, retains tab (78) on its upper surface. Post (76) is adhesively positioned on inside back panel (16) so as to receive compact disc (20). Once again, compact disc (20) pushes past or over flexible tab (78) to a point surrounding post (76). Tab (78) snaps back into position once compact disc (20) has pushed past it in a manner that allows tab (78) to partially retain compact disc (20) in place.

FIG. 10d discloses a structure well known in the art for retaining compact discs in place in such configurations as the above described "jewel boxes". This hard plastic twelve point star configuration provides a plurality of flexible star point posts (80) which each have a raised portion (82) defining a circular rim having a diameter equal to the inside diameter of the hole in the compact disc.

Figure 10E:
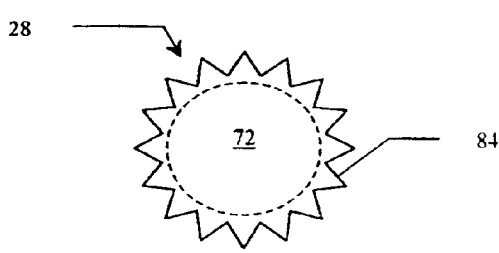
Figure 10F:
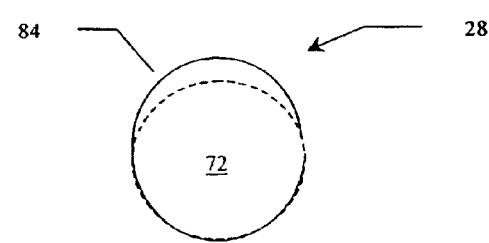

FIGS. 10e and 10f disclose two additional configurations possible for retaining compact disc (20) on center post (28).

In FIG. 10e, center post (28) is comprised of pedestal (72) and a plurality of star point tabs (84). In a manner similar to the configuration shown in FIG. 10c, tabs (84) serve to hold the CD in place once it is pushed down over pedestal (72) past tabs (84). FIG. 10f is a modification of the structure shown in FIG. 10b with only a crescent shaped tab (86) extending beyond the diameter of pedestal (72).

Each of the above described mechanisms for retaining the compact disc on a center post could be implemented with the basic features of the present invention. The preferred embodiment utilizes the construction shown in FIG. 10c because of its simplicity and ease of use. The pliable materials utilized in the embodiment shown in FIG. 10c are consistent with the materials utilized in the construction of the container as a whole. Although not critical to the construction of the container, it is desirable to eliminate as many hard plastic components as possible. It is believed that the protection to be afforded a compact disc lies less with the need to provide rigidity to the container and more with the need to adequately retain the compact disc in place and provide a sufficiently enclosing seal to prevent dust particles and the like from intruding into the container, and further to provide a durable surface to prevent scratching and abrasion to the compact disc.

Although the present invention has been described with respect to a number of preferred embodiments, it is anticipated that those skilled in the art will become aware of alternative embodiments not described here that fall within the scope of the invention. Although the basic material utilized for constructing the present invention is preferably a clear, plastic, pliable material, alternative non-clear, and in some instances non-plastic sheets, might be utilized under certain conditions. It is possible, for example, that instead of having printed paper material to be inserted into the container, the container panels themselves could be constructed of opaque plastic material that may be directly printed on. Colored, transparent, or semi-transparent panels are also anticipated by the present invention.

Those skilled in the art will also anticipate variations on the mechanisms for maintaining the covers closed against one another. In addition to the various configurations described for the magnetic strips, electrostatic attraction could be utilized to maintain the covers closed. There are, for example, plastic materials suitable for forming dielectric surfaces that adhere one to another when properly positioned. Such could be the construction of the inside back and front panels so that positioning them in close proximity provides an electrostatic attraction that temporarily and partially seals the covers closed.

Finally, those skilled in the art will anticipate a number of variations on the mechanism for centrally supporting the compact disc within the container. While one goal of the present invention is to eliminate the use of pockets for retaining the compact disc (primarily to eliminate the need to slide the compact disc in and out of a potentially abrasive envelope), there are yet a variety of mechanisms for both retaining the compact disc on a center post and surrounding it with a molded back panel to prevent its slippage from side to side.

The primary features of the present invention include its simplified construction from a pliable yet durable material in a manner that provides both for the placement of the compact disc and the placement of printed materials within the container. The container itself is maintained closed by magnetic or electrostatic forces in a manner that eliminates the need for most if not all of the mechanical closure components of the heretofore typical jewel box container.

What is claimed is:

1. A container for retaining and storing a compact disc and accompanying printed materials, the container comprising:

a back cover comprising a rectangular outside back panel and a rectangular inside back panel, said outside and inside back panels each constructed of thin, pliable, sheet-like, transparent, plastic material sealed together at their perimeters on at least one side thereof to form a pocket therebetween for retention of said printed materials;

a front cover comprising a rectangular outside front panel and a rectangular inside front panel, said outside and inside front panels each constructed of thin, pliable, sheet-like, transparent, plastic material sealed together at their perimeters on at least one side thereof to form a pocket therebetween for retention of said printed materials, said front cover attached to said back cover along a common edge thereof and foldable between a fully open position with said front and back covers apart and coplanar and a closed position with said front and back covers adjacent and parallel, said fully open position permitting insertion and removal of said compact disc from said container without sliding contact between said compact disc and said inside front and back panels;

a first closure means component positioned on the perimeter of said inside front panel on all edges thereof except said common edge; and a second closure means component positioned on the perimeter of said inside back panel on all edges thereof except said common edge, and comprising a material attractive to said first closure means component;

wherein said compact disc may be positioned between said back cover and said front cover and retained within the confines of said container, surrounded by said closure means components on three sides thereof and said common edge on a fourth side thereof, when said front cover is folded over said back cover so as to match with said back cover at said closure means components said closure means components forming a barrier to the removal of said compact disc from said container and a barrier to the entry of foreign particulate matter.

2. The container of claim 1 wherein said back cover and said front cover are constructed from a single sheet of material, said sheet generally rectangular in shape and having a length dimension approximately four times a width dimension, said sheet folded back on itself by bringing a first and a second width edge thereof to a centerline of said sheet to overlay and form said outside and inside back panels and said outside and inside front panels, said width edges sealed at said centerline to form said common edge of said front and back covers.

3. The container of claim 1 wherein:

said back cover further comprises an interior panel positioned between said outside and inside back panels; and said front cover further comprises an interior panel positioned between said outside and inside front panels.

4. The container of claim 1 wherein:

said first closure means component comprises a magnetic strip adhesively positioned on said perimeter of said inside front panel, said magnetic strip having a thickness at least one half a thickness of said compact disc; and said second closure means component comprises a magnetic strip adhesively positioned on said perimeter of said inside back panel, said magnetic strip having a thickness at least one half a thickness of said compact disc, said second closure means component having a magnetic polar orientation opposite that of said first closure means component, such that said second closure means component is magnetically attracted to said first closure means component.

* * * * *